United States Patent [19]

Shimizu et al.

[11] 4,081,419
[45] Mar. 28, 1978

[54] PROCESS FOR PRODUCING A POLYMER EMULSION

[75] Inventors: Akihiko Shimizu; Takao Hayashi, both of Shin-nanyo, Japan

[73] Assignee: Toyo Soda Manufacturing Co., Ltd., Japan

[21] Appl. No.: 690,906

[22] Filed: May 28, 1976

[30] Foreign Application Priority Data

Jun. 12, 1975  Japan .................................. 50-70166

[51] Int. Cl.$^2$ ................................................ C08L 9/10
[52] U.S. Cl. ...................... 260/29.6 HN; 260/29.7 H; 260/29.7 T
[58] Field of Search ................. 260/29.6 HN, 29.7 H, 260/29.7 T

[56] References Cited

U.S. PATENT DOCUMENTS

| 3,544,318 | 12/1970 | Boothe et al. | 260/29.7 H |
| 3,780,092 | 12/1973 | Samoun et al. | 260/29.6 HN |
| 3,873,488 | 3/1975 | Gibbs et al. | 260/29.7 H |
| 3,926,890 | 12/1975 | Huang et al. | 260/29.7 H |

Primary Examiner—M. J. Welsh
Attorney, Agent, or Firm—Oblon, Fisher, Spivak, McClelland & Maier

[57] ABSTRACT

A polymer emulsion is produced by the free radical polymerization of a monomer having an ethylenic unsaturated double bond in the presence of 0.1 to 10 wt parts of a compound having the formula

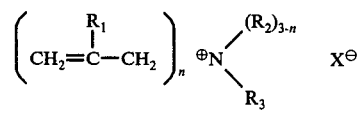

wherein $R_1$ represents hydrogen atom or methyl group; $R_2$ represents hydrogen atom, methyl or ethyl group; $R_3$ represents an alkyl group having 6 to 22 carbon atoms; $n$ is 1, 2, or 3; and X represents a halogen atom, per 100 wt parts of the monomer.

6 Claims, No Drawings

PROCESS FOR PRODUCING A POLYMER EMULSION

BACKGROUND OF THE INVENTION

1. Field of the Invention

The present invention relates to a process for producing a cationic polymer emulsion. More particularly, it relates to a process for producing a cationic emulsion of polymer which has both mechanical and chemical stability.

2. Description of the Prior Art

In the manufacture of synthetic rubbers, synthetic resins and paints, aqueous emulsion polymerization using an emulsifier has been employed to produce the polymer. The conventional emulsifiers used, however, have deleterious effects on the properties of the latex or polymer produced. Further, the conventional emulsifiers can cause difficulties. Recently, pollution caused by the conventional emulsifiers has become a problem. Conventional emulsifiers are found in the waste water from the washing and filtering steps of the process for producing a polymer by emulsion polymerization, and the discharged waste water is a source of water pollution. In addition, the emulsifier that remains in the polymer causes the polymer to adhere on mixing rolls and molds.

In preparing adhesive compositions, it is necessary to use emulsion-type adhesive compositions instead of solvent-type adhesive compositions because of the air pollution caused by the solvents in solvent-based adhesive compositions. Unfortunately, the conventional emulsifiers have the effect of lowering the adhesive property of the emulsion. It has been theorized that these difficulties are caused by the bonding of the conventional emulsifiers through physical adsorption on the polymer particles in the emulsion. It is known that conventional emulsifiers can be removed from the polymer particles when heat or pressure is applied to them.

It has been proposed to produce polymer emulsions by using an unsaturated acid or a reactive emulsifier without using the conventional emulsifiers (Japanese Unexamined Patent Publication Nos. 34588/1974 and 40388/1974). However, there is no disclosure in the prior art for producing a cationic polymer emulsion.

Accordingly, there exists a need for a process which can prepare cationic polymer emulsions without using conventional emulsifiers.

SUMMARY OF THE INVENTION

It is an object of the present invention to provide a process for the production of a cationic polymer emulsion having mechanical and chemical stability without using conventional cationic emulsifiers. Polymer emulsion means aqueous emulsions of homopolymers or copolymers of a monomer having an ethylenically unsaturated double bond.

This and other objects of the present invention have been attained by producing a cationic polymer emulsion by free radical polymerization of a monomer having an ethylenically unsaturated double bond in the presence of 0.1 to 10 wt parts, preferably 2 to 5 wt parts of a compound having the formula

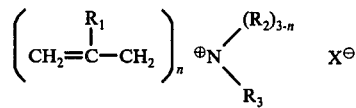

wherein $R_1$ represents hydrogen atom or methyl group; $R_2$ represents hydrogen atom, methyl or ethyl group; $R_3$ represents an alkyl group having 6 to 22 carbon atoms; $n$ is 1, 2 or 3; and X represents a halogen atom, per 100 wt parts of the monomer.

DETAILED DESCRIPTION OF THE PREFERRED EMBODIMENTS

The compounds having the above formula can be produced by reacting a primary, secondary or tertiary amine having a $C_{6-22}$ alkyl group with an alkyl halide such as allyl chloride, methallyl chloride, allyl bromide and the like. Typical componds having the formula include allyldodecylammonium chloride, methallyltridecylammonium chloride, diallyldodecylammonium chloride, triallyldodecylammonium bromide, allyldimethyloctylammonium chloride, methallyldimethyloctadecylammonium chloride, methallyldimethylcoconutalkylammonium bromide, allyldimethyldodecylammonium chloride, diallylmethylhexylammonium chloride, and the like. The reactive emulsifier can be used by itself, or used together with a conventional cationic emulsifer such as dodecyltrimethylammonium chloride, coconutalkyltrimethylammonium chloride, coconutalkyldimethylbenzylammonium chloride, dodecylpyridinum chloride and the like.

The monomers having an ethylenically unsaturated double bond used in this invention include dienes such as 1-chlorobutadiene, 2,3-dichlorobutadiene, 2-cyanobutadiene, isoprene, chloroprene, etc. and ethylene, styrene, vinyl chloride, vinyl acetate, vinyl pyridine, acrylonitrile, acrylates and methacrylates, and mixtures thereof.

Known free radical initiators can be used in the process of this invention; 2,2' azobisisobutylamidine hydrochloride having a cationic terminal group is especially preferable. It is also possible to use mixtures of hydroperoxide and amines or other known redox-type catalysts, as the initiator.

It is possible to use conventional molecular weight modifiers which have been previously used in emulsion polymerization. Typical molecular weight modifiers include alkylmercaptans, alkylxanthogendisulfides, halohydrocarbons and the like. It is also possible to add a polyfunctional monomer such as divinylbenzene, glycidylmethacrylate, etc., in order to form a gel. The amount of the additives can be selected as desired to control the molecular weight and gelation.

The polymerization can be conducted at 0° to 100° C, preferably 10° to 80° C. The pH of the polymerization system can be in the broad range of acidic to alkaline pH, but is preferably in the range of neutral to acidic pH.

The polymerization can be stopped by adding a conventional polymerization inhibitor such as hydroquinone, t-butyl catechol, phenothiazine, etc. When unreacted monomer remains, it can be removed by treating the polymerization mixture at an elevated temperature under reduced pressure.

Having generally described the invention, a more complete understanding can be obtained by reference to certain specific examples, which are included for purposes of illustration only and are not intended to be limiting unless otherwise specified.

In the examples, the term "part" designates "part by weight" unless otherwise defined.

EXAMPLES 1 to 2

The polymerization was conducted in a four necked flask equipped with a stirrer, a condenser and a temperature detecting device in a nitrogen atomsphere. Allyl dimethylcoconutalkylammonium chloride was dissolved in 130 parts of water at the ratio set forth in Table 1. A mixture of 0.25 wt part of n-dodecylmercaptan and 100 parts of chloroprene was added to the aqueous solution with stirring. When it reached 40° C, 0.5 parts of 2,2'-azobisisobutylamidinum chloride as a polymerization initiator was added to initiate the polymerization. When the conversion reached 80%, the polymerization was stopped by adding hydroquinone. After the addition of hydroquinone, the unreacted monomer was removed by the conventional stripping method. As shown in Table 1, no aggregate was formed and the resulting emulsion has high stability after the polymerization. Even though methanol was added to the emulsion, no aggregate was formed demonstrating high chemical stability.

TABLE 1

| Example | Allyldimethyl coconutalkyl ammonium chloride | Time for polymerization | Surface tension (d/cm) | Aggregate (g) |
|---|---|---|---|---|
| 1 | 2 | 240 | 41.6 | 0 |
| 2 | 4 | 180 | 36.6 | 0 |

EXAMPLES 3 to 9

In the apparatus of Example 1, the polymerization of Example 1 was repeated except using 4.0 parts of the reactive emulsifier instead of 2.0 parts of allyldimethylcoconutalkylammonium chloride, and the polymerization was stopped and the unreacted monomer was distilled out. As shown in Table 2, no aggregate was found after the polymerization.

TABLE 2

| Ex. No. | Reactive emulsifier | Time for polymerization (min) | Surface tension (d/cm) | Aggregate (g) |
|---|---|---|---|---|
| 3 | allyldimethylcoconutalkylammonium bromide | 185 | 36.3 | none |
| 4 | methacryldimethylcoconutalkylammonium chloride | 180 | 37.4 | none |
| 5 | allyldimethyldodecylammonium chloride | 170 | 34.2 | none |
| 6 | methallyldimethyltetradecylammonium chloride | 195 | 35.2 | none |
| 7 | allyldimethyloctadecylammonium chloride | 180 | 36.7 | none |
| 8 | diallyldodecylammonium chloride | 195 | 38.8 | none |
| 9 | triallyloctylammonium chloride | 210 | 39.6 | none |

The surface tension of the emulsion was satisfactorily low so that the resulting emulsion was stable and had as high chemical stability as that of Example 1.

EXAMPLES 10 to 12

In the process of Example 7, 100 parts of the monomer shown in Table 3 was used instead of 100 parts of chloroprene and the emulsions were produced. The surface tension of the emulsion was statisfactorily low so that the resulting emulsion was stable and had as high a chemical stability as that of Example 1.

TABLE 3

| Example No. | Monomer | Time for polymerization (min) | Surface tension (d/cm) | Aggregate |
|---|---|---|---|---|
| 10 | styrene | 485 | 33.5 | none |
| 11 | methyl methacrylate | 510 | 37.2 | none |
| 12 | vinyl acetate | 360 | 34.3 | none |

EXAMPLE 13

A stainless steel autoclave equipped with an electromagnetic stirrer and a pressure gauge was purged with nitrogen and was kept in a reduced pressure. 130 Parts of water, 3.0 parts of allyldimethylcoconutalkylammonium chloride, 0.3 part of n-dodecylmercaptan and 100 parts of butadiene were charged into the autoclave. When the temperature reached 40° C, 1.0 part of 2,2'-azobisisobutylamidine chloride were added to initate the polymerization. The mixture was heated for 8 hours to polymerize it to a conversion of 73%. The unreacted monomer was removed by the conventional stripping method. No aggregate was found and the resulting emulsion was stable. The surface tension of the emulsion was satisfactorily low, 37.1 d/cm, so as to be stable and the resulting emulsion had as high a chemical stability as that of Example 1.

EXAMPLE 14

In the process of Example 5, a mixture of 90 parts of chloroprene and 10 parts of 2,3-dichlorobutadiene were used instead of 100 parts of chloroprene and the emulsion was produced. No aggregate was found and the resulting emulsion was stable. The surface tension of the emulsion was satisfactorily low, 34.5 d/cm, so as to be stable and the resulting emulsion had high chemical stability.

EXAMPLE 15

In the process of Example 14, styrene was used instead of 2,3-dichlorobutadiene and the emulsion was produced. No aggregate was found and the resulting emulsion was stable. The surface tension of the emulsion was satisfactorily low, 34.2 d/cm, so as to be stable. Even though methanol was added to the emulsion, no aggregate was formed, thus demonstrating the high chemical stability of the emulsion.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for producing a cationic polymer emulsion which comprises free radical polymerization of a monomer having an ethylenically unsaturated double bond in the presence of from 0.1 to 10 wt. parts of a compound having the formula:

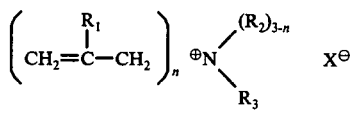

wherein $R_1$ represents hydrogen or methyl; $R_2$ represents hydrogen, methyl or ethyl; $R_3$ represents an alkyl group having from 6 to 22 carbon atoms; $n$ is 1, 2 or 3 and X represents a halogen atom; per 100 wt. parts of the monomer, wherein 2,2'-azobisisobutylamidine hydrochloride is the free radical initiator.

2. The process of claim 1, wherein the monomer having an ethylenically unsaturated double bond is selected from 1-chlorobutadiene, 2,3-dichlorobutadiene, 2-cyanobutadiene, isoprene, chloroprene, ethylene, styrene, vinyl chloride, vinyl acetate, pyridine, acrylonitrile, acrylates, methacrylates and mixtures thereof.

3. The process of claim 1, wherein the compound of the formula is selected from the group consisting of allyldodecylammonium halides, methallyltridecylammonium halides, diallyldodecylammonium halides, triallyldodecylammonium halide, allyldimethyloctylammonium halides, methallyldimethyloctadecylammonium halide, methallyldimethylcoconutalkylammonium halide, allyldimethyldodecylammonium halide and diallylmethylhexylammonium halides.

4. The process of claim 1, wherein a small amount of a conventional cationic emulsifier is added to emulsify the monomer.

5. The process of claim 1, wherein a molecular weight modifier is added to control the molecular weight.

6. The process of claim 1, wherein a polyfunctional monomer is present during said free radical polymerization, wherein said polyfunctional monomer is selected such that a gel is produced by said free radical polymerization.

* * * * *